(12) United States Patent
Moriyama et al.

(10) Patent No.: US 10,260,623 B2
(45) Date of Patent: Apr. 16, 2019

(54) VEHICULAR TRANSMISSION

(71) Applicants: TOYOTA JIDOSHA KABUSHIKI KAISHA, Toyota-shi, Aichi (JP); AISIN AW CO., LTD., Anjo-shi, Aichi (JP)

(72) Inventors: Shuji Moriyama, Nagakute (JP); Takafumi Inagaki, Toyota (JP); Yoshinobu Soga, Toyota (JP); Yoshihiro Mizuno, Nagoya (JP); Hiromitsu Nitani, Nagakute (JP); Yuji Iwatsuru, Anjo (JP)

(73) Assignees: TOYOTA JIDOSHA KABUSHIKI KAISHA, Toyota (JP); AISIN AW CO., LTD., Anjo (JP)

( * ) Notice: Subject to any disclaimer, the term of this patent is extended or adjusted under 35 U.S.C. 154(b) by 110 days.

(21) Appl. No.: 15/505,342

(22) PCT Filed: Aug. 18, 2015

(86) PCT No.: PCT/JP2015/073161
§ 371 (c)(1),
(2) Date: Feb. 21, 2017

(87) PCT Pub. No.: WO2016/027814
PCT Pub. Date: Feb. 25, 2016

(65) Prior Publication Data
US 2017/0268657 A1    Sep. 21, 2017

(30) Foreign Application Priority Data

Aug. 20, 2014  (JP) .................................. 2014-167859

(51) Int. Cl.
*F16H 57/04* (2010.01)
*F16H 61/00* (2006.01)
*F15B 21/041* (2019.01)

(52) U.S. Cl.
CPC ....... *F16H 61/0009* (2013.01); *F15B 21/041* (2013.01); *F16H 57/04* (2013.01);
(Continued)

(58) Field of Classification Search
CPC ............ F16H 57/0404; F16H 57/0435; F16H 57/0452
(Continued)

(56) References Cited

U.S. PATENT DOCUMENTS 4,096,878 A * 6/1978 Adams .................. E02F 9/2267
137/343
4,995,971 A * 2/1991 Droste ............... F01M 11/0004
184/6.2

(Continued)

FOREIGN PATENT DOCUMENTS

JP    2001-296169 A    10/2001
JP    2012-042007 A    3/2012

*Primary Examiner* — Kevin F Murphy
(74) *Attorney, Agent, or Firm* — Oliff PLC

(57) ABSTRACT

A vehicle transmission having a valve body disposed adjacently to and in parallel with a side cover covering a front or rear side or a side surface of a transmission case in a vehicle width direction in a vehicle-mounted state, the side cover connected to the transmission case, in which an electromagnetic valve is included on the side cover side of the valve body, when viewed in a direction horizontal and parallel to mating surfaces of the transmission case and the side cover, a strainer for removing a foreign material in a hydraulic oil is disposed between the side cover and the valve body to overlap with at least a portion of the electromagnetic valve, and the strainer has an inflow portion for allowing the hydraulic oil to flow in disposed vertically above an oil surface.

5 Claims, 3 Drawing Sheets

(52) U.S. Cl.
CPC ..... *F16H 57/0404* (2013.01); *F16H 57/0435* (2013.01); *F16H 57/0446* (2013.01); *F16H 57/0452* (2013.01); *F16H 61/0021* (2013.01); *F16H 2061/0037* (2013.01)

(58) Field of Classification Search
USPC .............................. 210/167.08; 137/351, 354
See application file for complete search history.

(56) References Cited

U.S. PATENT DOCUMENTS

| | | | | |
|---|---|---|---|---|
| 6,688,328 | B2* | 2/2004 | Van Wie | F15B 1/26 137/354 |
| 7,387,190 | B2* | 6/2008 | Lochocki, Jr. | F16H 57/0452 184/1.5 |
| 7,637,336 | B2* | 12/2009 | Enomoto | B60K 6/26 180/339 |
| 8,038,877 | B2* | 10/2011 | Stausberg | B01D 29/52 184/6.24 |
| 8,292,036 | B2* | 10/2012 | Nishida | F16H 57/0402 184/6.2 |
| 8,496,812 | B2* | 7/2013 | Beer | F01M 11/0004 210/167.03 |
| 8,500,998 | B2* | 8/2013 | Tsunematsu | F16H 57/0404 210/167.01 |
| 8,707,984 | B2* | 4/2014 | Lundgren | E02F 9/2267 137/354 |
| 2009/0107769 | A1* | 4/2009 | Sato | B60K 6/365 184/6.2 |
| 2009/0127174 | A1* | 5/2009 | Shinbori | B01D 35/0273 210/167.08 |
| 2009/0139922 | A1* | 6/2009 | Poskie | B01D 35/0273 210/167.08 |

* cited by examiner

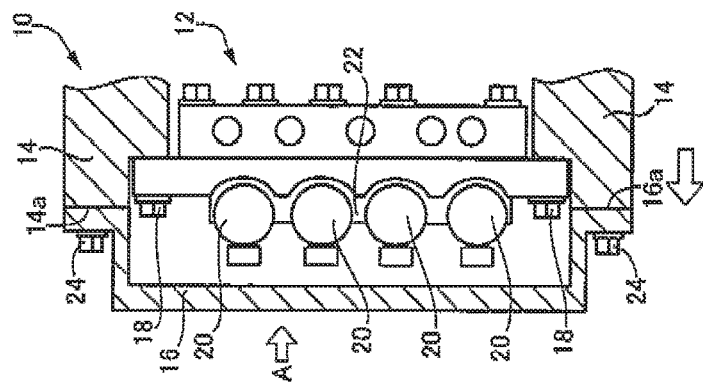
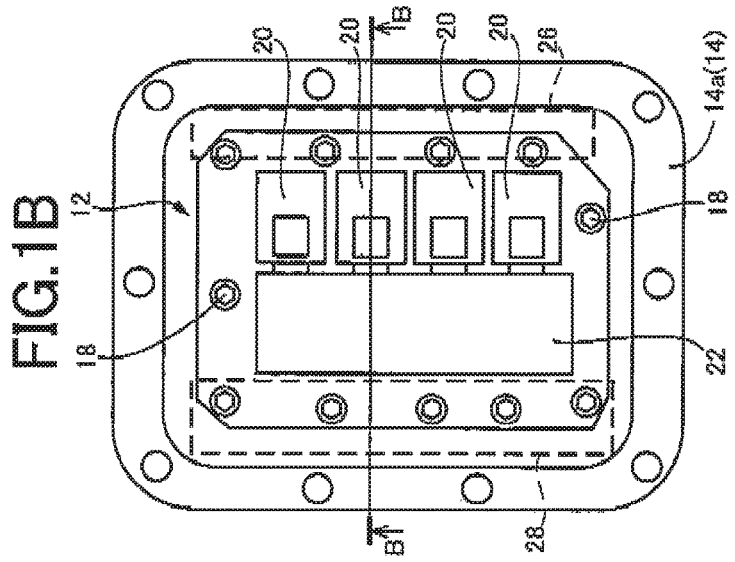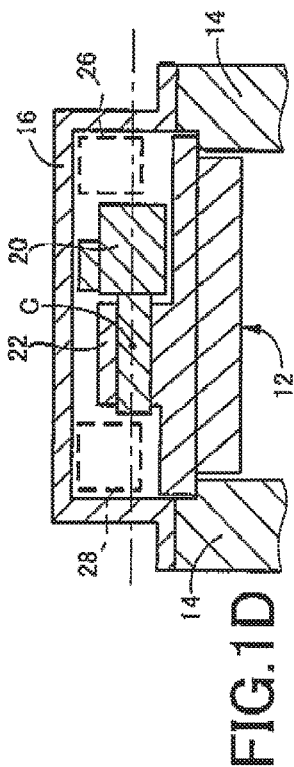
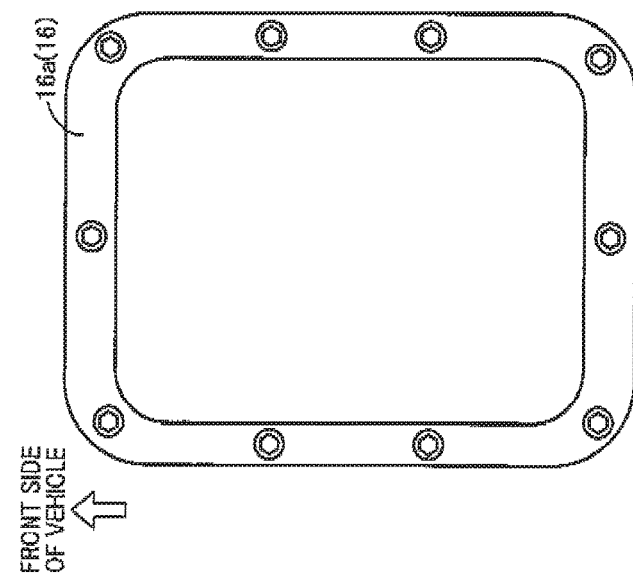

VEHICULAR TRANSMISSION

TECHNICAL FIELD

The present invention relates to a vehicle transmission and particularly to a vehicle transmission in which a valve body disposed in the transmission to control a hydraulic pressure supplied to a hydraulic actuator etc. is disposed on the front or rear side of a vehicle or the vehicle width side.

BACKGROUND ART

A transmission is achieved that has a valve body disposed on the front or rear side of the transmission or on the vehicle width side in a vehicle-mounted state i.e., in a state where the valve body is mounted on the vehicle with a valve body cover (side cover) connected to the valve body so as to cover the valve body. For example, a transmission of Patent Document 1 is an example thereof. In the transmission of Patent Document 1, a valve body 11 is disposed on the vehicle front side relative to a transmission mechanism, and an oil pan 3 (a valve body cover, a side cover) defined as a portion of the transmission case 1 is connected to cover the valve body 11.

PRIOR ART DOCUMENTS

Patent Documents

Patent Document 1: Japanese Laid-Open Patent Publication No. 2001-296169
Patent Document 2: Japanese Laid-Open Patent Publication No. 2012-42007

SUMMARY OF THE INVENTION

Problem to Be Solved by the Invention

From the view point of improvement of fuel efficiency, a consumption flow rate is further reduced in a hydraulic pressure control device including an electromagnetic valve. Means of reducing a consumption flow rate of a hydraulic pressure control device include making a valve clearance smaller in a valve including an electromagnetic valve. If the valve clearance is made smaller in this way and a foreign material enters the inside of a hydraulic circuit, the occurrence of valve stick becomes notable. Therefore, it is important to improve a filtering efficiency of a strainer in the hydraulic pressure control device. To suppress a loss at an oil pump while ensuring a filtering efficiency of a strainer, the strainer must be made larger. However, as transmissions are reduced in size, a larger strainer causes a problem that it becomes difficult to mount a strainer on a transmission.

The present invention was conceived in view of the situations and it is therefore an object of the present invention to provide a structure of a vehicle transmission improving a mountability of a strainer in a vehicle transmission having a valve body disposed on the front or rear side of a vehicle or on the vehicle width side.

Solution to Problem

To achieve the above object, a first aspect of the invention provides a vehicle transmission (a) having a valve body disposed adjacently to and in parallel with a side cover covering a front or rear side or a side surface of a transmission case in a vehicle width direction in a vehicle-mounted state, the side cover connected to the transmission case, wherein (b) an electromagnetic valve is included on the side cover side of the valve body, (c) when viewed in a direction horizontal and parallel to mating surfaces of the transmission case and the side cover, a strainer for removing a foreign material in a hydraulic oil is disposed between the side cover and the valve body to overlap with at least a portion of the electromagnetic valve, and (d) the strainer has an inflow portion for allowing the hydraulic oil to flow in disposed vertically above an oil surface (oil level).

A second aspect of the invention provides the vehicle transmission recited in the first aspect of the invention, wherein (a) a first space is formed between the side cover and the strainer, (b) a filter for filtering is disposed in the first space, (c) the strainer has an outflow portion disposed vertically under the oil surface, (d) the hydraulic oil flowing into the first space from the inflow portion passes through the filter and flows out from the outflow portion, and (e) the hydraulic oil flowing out from the outflow portion is supplied through the valve body to a lubrication required portion.

A third aspect of the invention provides the vehicle transmission recited in the first aspect of the invention, wherein (a) a first space is formed between the side cover and the strainer, (b) a filter for filtering is disposed in the first space, (c) at least one oil outflow hole is formed at positions lower than the inflow portion in the vertical direction of the strainer, (d) the hydraulic oil flowing into the first space from the inflow portion passes through the filter and flows out from the oil outflow hole, and (e) the hydraulic oil flowing out from the oil outflow hole is discharged to a second space on the transmission case side.

A fourth aspect of the invention provides the vehicle transmission recited in the second or third aspect of the invention, wherein (a) the filter is disposed in the vertical direction, and the first space is divided into two spaces by disposing the filter in the vertical direction.

Advantageous Effects of the Invention

According to the vehicle transmission recited in the first aspect of the invention, since the space is utilized that is formed by disposing the electromagnetic valves on the side cover side of the valve body between the side cover and the valve body and the strainer is disposed in the space at a position without interference of the electromagnetic valves, the strainer can be disposed without expanding the side cover. Since the inflow portion for the hydraulic oil is disposed vertically above the oil surface of the strainer, the filtering can be performed by using gravity and the hydraulic pressure loss (pressure loss) of the hydraulic oil can be reduced.

According to the vehicle transmission recited in the second aspect of the invention, since the hydraulic oil flowing into the first space passes through the filter and flows out from the outflow portion disposed vertically under the oil surface and is then supplied through the valve body to a lubrication required portion, the hydraulic oil filtered by the filter is supplied to the lubrication required portion. Since the inflow portion is disposed at a position vertically higher than the oil surface, the filtering can be performed by using gravity.

According to the vehicle transmission recited in the third aspect of the invention, since the hydraulic oil flowing into the first space passes through the filter and flows out from the oil outflow hole and is then discharged to the second space on the transmission case side, the hydraulic oil filtered by the filter is discharged to and accumulated in the second space on the transmission case side. Since the inflow portion is disposed at a position vertically higher than the oil outflow hole, the filtering can be performed by using gravity.

According to the vehicle transmission recited in the fourth aspect of the invention, the filter is disposed in the vertical direction. Consequently, the first space is vertically divided into two spaces and a foreign material in the hydraulic oil is effectively removed by the filter even during a transition period in which the hydraulic oil flowing into the first space from the inflow portion moves vertically downward due to gravity.

BRIEF DESCRIPTION OF DRAWINGS

FIGS. 1A to 1D show a structure of connection of a valve body acting as a portion of a vehicle transmission to which the present invention is preferably applied, specifically, as a portion of a hydraulic pressure control device of the vehicle transmission, to a transmission case.

MODE FOR CARRYING OUT THE INVENTION

Figure 2A:
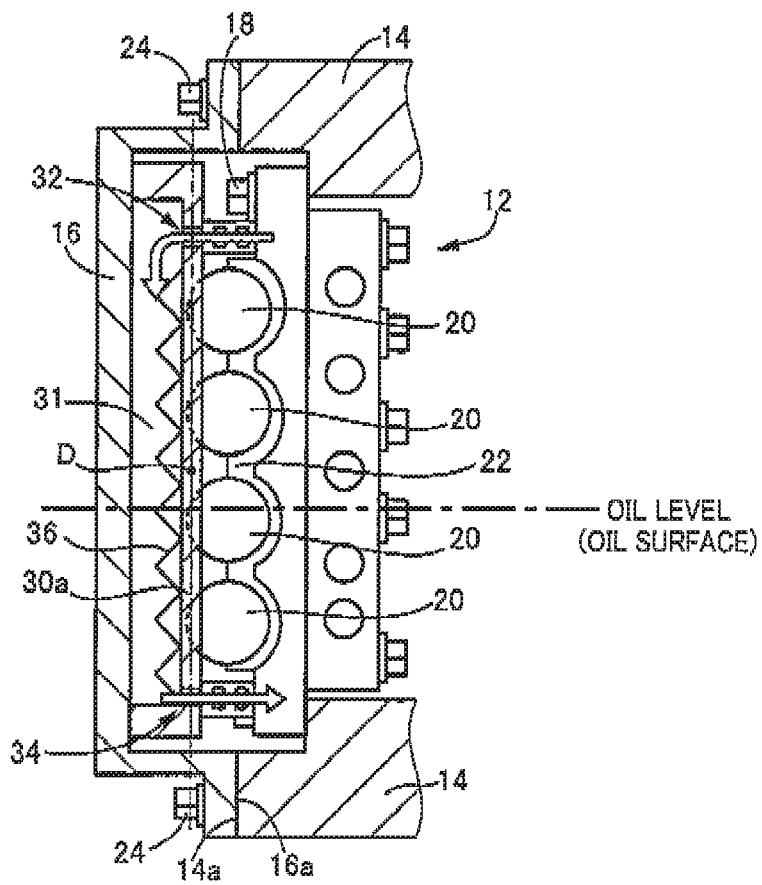
FIGS. 2A and 2B show a form in which a strainer is disposed between the valve body and a side cover in FIGS. 1A and 1B.

An example of the present invention will now be described in detail with reference to the drawings. In the following example, the figures are simplified or deformed as needed and portions are not necessarily precisely shown in terms of dimension ratio, shape, etc.

Example

FIGS. 1A to 1D show a structure of connection of a valve body 12 acting as a portion of a vehicle transmission 10 to which the present invention is preferably applied, specifically, as a portion of a hydraulic pressure control device of the vehicle transmission 10, to a transmission case 14. FIG. 1A shows a state in which the valve body 12 is connected to the transmission case 14 of the vehicle transmission 10. FIG. 1B is an arrow view taken in the direction of an arrow A of FIG. 1A and shows a state in which a side cover 16 covering the valve body 12 is removed. FIG. 1C shows the side cover 16. FIG. 1D shows a cross section taken along B-B of FIG. 1B.

Describing FIGS. 1A and 1B, the valve body 12 has a substantially rectangular parallelepiped shape and is disposed adjacently to the side cover 16 covering the valve body 12 on the vehicle front side in a vehicle-mounted state i.e., in a state where the valve body 12 is mounted on a vehicle. The valve body is disposed such that a longitudinal direction (longest part) of the valve body 12 is parallel with the vertical direction. In other words, the valve body 12 is disposed in a vertically placed state.

The valve body 12 is fastened by a plurality of (in this example, eleven) bolts 18 such that a mating surface of a stepped portion formed on both ends in the vertical direction and both ends in the vehicle width direction comes into contact with a mating surface of a stepped portion formed on the transmission case 14.

The valve body 12 includes a plurality of (in this example, four) electromagnetic valves 20 on the vehicle front side, i.e., the side adjacent to the side cover. The electromagnetic valves 20 each have a substantially columnar shape and are disposed such that a longitudinal direction of each the electromagnetic valve 20 is horizontal to the ground surface. Therefore, the electromagnetic valves 20 are disposed laterally to the vertically-placed valve body 12. Since the electromagnetic valves 20 are horizontally disposed (laterally placed) relative to the ground surface, a gravity effect, i.e., a valve malfunction due to gravity is suppressed. The electromagnetic valves 20 are arranged side by side in the vertical direction. The electromagnetic valves 20 are each connected at one end in the longitudinal direction to a projected portion 22 projected from the valve body 12 toward the side cover 16.

As shown in FIG. 1C, the side cover 16 has a bottomed tray shape and is fastened by a plurality of bolts 24 such that a mating surface 16a formed on the outer edge of the side cover 16 comes into contact with a mating surface 14a formed on the transmission case 14.

The electromagnetic valves 20 are laterally placed and arranged side by side in the vertical direction with both ends in the longitudinal direction aligned when viewed in the vertical direction. As a result, spaces 26, 28 indicated by broken lines of FIG. 1B are formed between both ends of the electromagnetic valves 20 and the outer edge of the side cover 16. Both the spaces 26, 28 have a shape elongated in the vertical direction. In this example, a strainer for removing a foreign material is disposed in the space 26. Specifically, when viewed in the direction parallel and horizontal to the mating surfaces 14a, 16a of the transmission case 14 and the side cover 16 (i.e., the direction of viewing along a plane including a point C of FIG. 1D and parallel to the mating surfaces 14a, 16a), the strainer is disposed to overlap with at least a portion of the electromagnetic valves 20 as indicated by a dashed-dotted line. In other words, the strainer is disposed at a position without overlap with the electromagnetic valves 20 when viewed in the perpendicular direction. It is noted that the spaces 26, 28 are formed between the end portions of the electromagnetic valves 20 and the outer edge of the side cover 16 because spaces are necessary for disposing the bolts 18 connecting the valve body 12 to the transmission case 14.

Figure 2B:
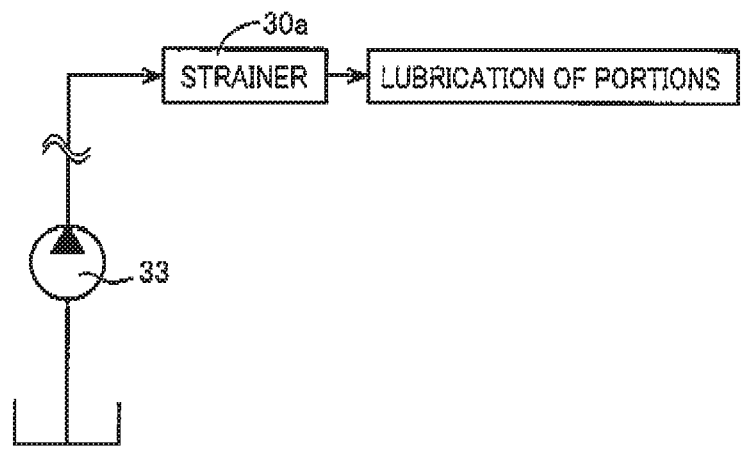

FIGS. 2A and 2B show a form in which a strainer 30a is disposed in the space 26 formed between the valve body 12 and the side cover 16. FIG. 2A corresponds to FIG. 1A, and FIG. 2B shows a hydraulic circuit, which corresponds to FIG. 2A. In FIG. 2A, the strainer 30a is disposed at a position corresponding to the space 26 of FIG. 1B. As can be seen from FIG. 2A, when viewed in the direction parallel and horizontal to the mating surfaces 14a, 16a of the transmission case 14 and the side cover 16 (the direction of viewing along a plane including a point D of FIG. 2A and parallel to the mating surfaces 14a, 16a), the strainer 30a is disposed to overlap with at least a portion of the electromagnetic valves 20 as indicated by a dashed-dotted line.

The side cover 16 and the strainer 30a are each made up of a resin member. The strainer 30a has a tray shape formed longitudinally in the vertical direction and the opening side thereof is integrally connected to the side cover 16 by bolts not shown, for example. A first space 31 is formed between the side cover 16 and the strainer 30a.

At a position higher than an oil surface (oil level) in the vertical direction of the strainer 30a, an inflow portion 32 is disposed for allowing a hydraulic oil to flow into the first space 31 from the valve body 12 as indicated by an arrow. FIG. 2B schematically shows a portion of the hydraulic circuit applied in FIG. 2A. The hydraulic pressure of the hydraulic oil pumped up by an oil pump 33 is used as a source pressure to generate a line pressure, which is supplied to a hydraulic actuator etc. not shown included in the transmission 10. A portion of the fluid having hydraulic pressure is adjusted to a lower pressure and then supplied to a lubrication oil passage in the valve body 12, and the hydraulic oil in the lubrication oil passage is supplied through the valve body 12 from the inflow portion 32 of the strainer 30a.

At a position lower than the oil surface (oil level) in the vertical direction of the strainer 30a, an outflow portion 34 is disposed for allowing the hydraulic oil filtered through a filter 36 (filter material) to flow out to the valve body 12 as indicated by an arrow. The hydraulic oil flowing out from the outflow portion 34 is supplied through the valve body 12 to lubrication required portions requiring lubrication and is used for lubrication of the portions.

Since the integration of the side cover 16 and the strainer 30a as described above (a strainer-integrated cover) eliminates the need for a clearance between the side cover 16 and the strainer 30a, a larger space can be ensured for disposing the strainer 30a. Therefore, since the physical size of the strainer 30a can be made larger, the strainer 30a can be increased in strength and improved in filtering performance. Additionally, the lower-pressure hydraulic oil flowing from the valve body 12 is advantageous to the side cover 16 and the strainer 30a in view of strength so that the side cover 16 and the strainer 30a can be made thinner in plate thickness (resin plate thickness).

Since the inflow portion 32 is disposed at a position higher than the oil surface (oil level) in the vertical direction of the strainer 30a and the hydraulic oil flows in via this position, the filtering can be performed by using gravity and a hydraulic pressure loss (pressure loss) of the hydraulic oil is reduced. As a result, a pumping work of the oil pump can be reduced. Additionally, the filter 36 is disposed such that the longitudinal dimension thereof is the vertical direction in the first space 31 and the first space 31 is divided by the filter 36 into two spaces elongated in the vertical direction. The hydraulic oil is filtered when passing through the two spaces formed by the filter 36 and, additionally, since the hydraulic oil flowing into the first space 31 moves vertically downward due to gravity and foreign materials in the hydraulic oil are removed also during this moving period by the filter 36 disposed in the vertical direction, the efficiency of the filtering by the filter 36 is improved.

Figure 3A:
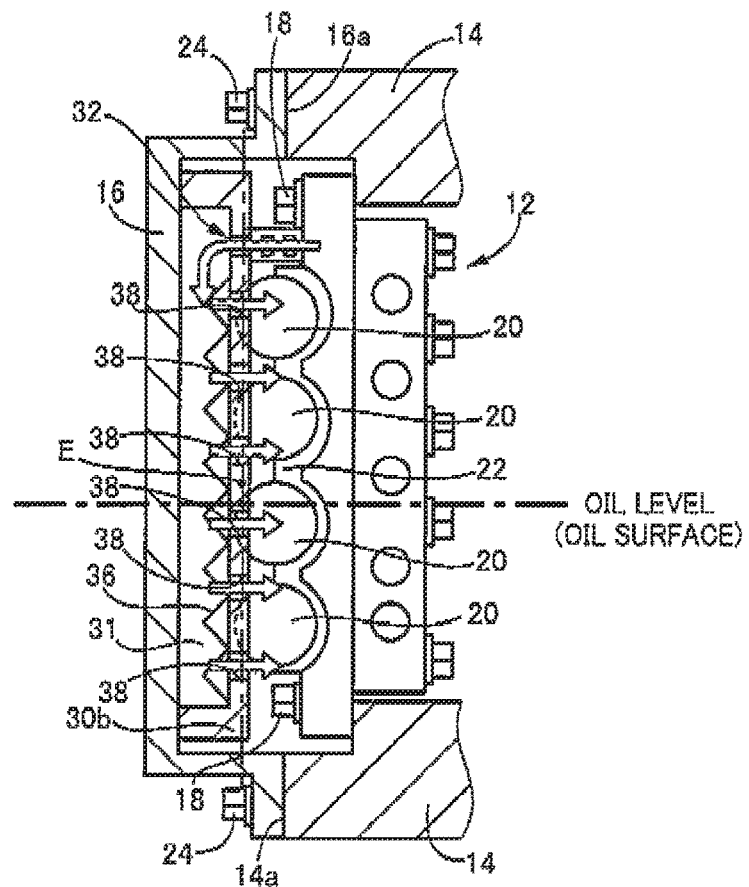
FIGS. 3A and 3B show another form in which a strainer is disposed between the valve body and the side cover in FIGS. 1A and 1B.
Figure 3B:
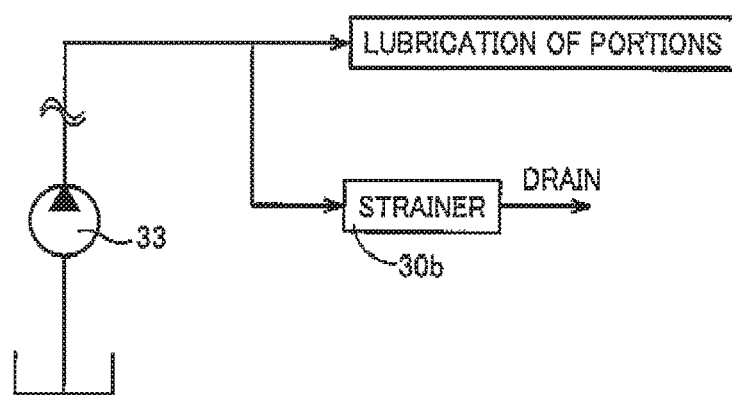

FIGS. 3A and 3B show another form in which a strainer 30b is disposed in the space 26 between the valve body 12 and the side cover 16. FIG. 3A corresponds to FIG. 1A, and FIG. 3B shows a hydraulic circuit, which corresponds to FIG. 3A. In FIG. 3A, the strainer 30b is disposed at a position corresponding to the space 26 of FIG. 1B. As can be seen from FIG. 3A, when viewed in the direction parallel and horizontal to the mating surfaces 14a, 16a of the transmission case 14 and the side cover 16 (the direction of viewing along a plane including a point E of FIG. 3A and parallel to the mating surfaces 14a, 16a), the strainer 30b is disposed to overlap with a portion of the electromagnetic valves 20 as indicated by a dashed-dotted line.

The strainer 30b is also made up of a resin member. The strainer 30b has a tray shape formed longitudinally in the vertical direction and the opening side thereof is integrally connected to the side cover 16 by bolts not shown, for example. A first space 31 is formed between the side cover 16 and the strainer 30b.

At a position higher than an oil surface (oil level) in the vertical direction of the strainer 30b, an inflow portion 32 is disposed for allowing a hydraulic oil to flow into the first space 31 from the valve body 12 as indicated by an arrow. FIG. 3B schematically shows a portion of the hydraulic circuit applied in FIG. 3A. The hydraulic pressure of the hydraulic oil pumped up by an oil pump 33 is used as a source pressure to generate a line pressure, which is supplied to a hydraulic actuator etc. included in the transmission 10. A portion of the hydraulic pressure is adjusted to a lower pressure and then supplied to the inflow portion 32 of the strainer 30b through a bypass oil passage branched from the lubrication oil passage in the valve body 12.

At positions lower than the inflow portion 32 in the vertical direction of the strainer 30b, at least one oil outflow hole 38 is formed. Therefore, the hydraulic oil flowing in from the inflow portion 32 is filtered through the filter 36 and then drained from the oil outflow hole 38 as indicated by arrows and, as shown in FIG. 3A, the hydraulic oil flowing out from the oil outflow hole 38 are accumulated in a second space formed on the transmission case 14 side.

Since the integration of the side cover 16 and the strainer 30b as described above eliminates the need for a clearance between the side cover 16 and the strainer 30b, a larger space can be ensured for disposing the strainer 30b. Therefore, since the physical size of the strainer 30b can be made larger, the strainer 30b can be increased in strength and improved in filtering performance. Additionally, since the hydraulic oil flowing through the bypass oil passage branched from a lubrication oil passage flows to the strainer 30b, the hydraulic oil with a lower pressure can be allowed to flow as compared to the hydraulic oil flowing through the lubrication oil passage of FIGS. 2A and 2B described above. This is more advantageous to the side cover 16 and the strainer 30b in view of strength so that the side cover 16 and the strainer 30b can further be made thinner in plate thickness (resin plate thickness).

Since the inflow portion 32 is disposed at a position higher than the oil surface (oil level) in the vertical direction of the strainer 30b and the hydraulic oil is supplied from this position, the filtering can be performed by using gravity and a hydraulic pressure loss (pressure loss) of the hydraulic oil is reduced. Since the hydraulic oil is allowed to flow out from the entire side surface of the strainer 30b, a reduction in residual pressure inside the strainer (the first space 31) enables effective filtering and is also advantageous in view of strength.

As described above, according to this example, since the space 26 is utilized that is formed by disposing the electromagnetic valves 20 on the side cover 16 side of the valve body 12 between the side cover 16 and the valve body 12 and the strainer 30a, 30b is disposed in the space 26 at a position without interference of the electromagnetic valves 20, the strainer 30a, 30b can be disposed without expanding the side cover 16. Since the inflow portion 32 for the hydraulic oil is disposed vertically above the oil surface of the strainer 30a, 30b, the filtering can be performed by using gravity and the hydraulic pressure loss (pressure loss) of the hydraulic oil can be reduced.

The example of the present invention has been described in detail with reference to the drawings, the present invention can be applied in other forms.

For example, although the valve body is disposed on the front side of the vehicle in the example, the present invention is applicable to vehicle transmission having the valve body disposed on the vehicle rear side or the vehicle lateral side i.e., at one end in the vehicle width direction.

Although the strainer 30a, 30b is disposed in the space 26 in the example, the strainer 30a, 30b may be disposed in the space 28. Although the two spaces of the space 26 and the space 28 are formed in the example, the present invention is applicable even when either one of the spaces is formed.

Although both the side cover 16 and the strainer 30a, 30b are made up of resin members in the example, this is not necessarily a limitation of the present invention.

Although the strainer 30a, 30b is formed to the vicinities of the upper and lower outer edges of the side cover 16 in the vertical direction in the example, this is not necessarily a limitation and the strainer 30a, 30b may be formed in a part of the side cover 16 in the vertical direction.

The above description is merely an embodiment and the present invention may be implemented in variously modified and improved forms based on the knowledge of those skilled in the art.

REFERENCE SIGNS LIST

10: Vehicle transmission
12: Valve body
14: Transmission case
16: Side cover
20: Electromagnetic valve
30a, 30b: Strainer
32: Inflow portion

The invention claimed is:

1. A vehicle transmission having a valve body disposed adjacently to and in parallel with a side cover covering a front or rear side or a side surface of a transmission case in a vehicle width direction in a vehicle-mounted state such that a longitudinal direction of the valve body extends along a vertical direction, the side cover connected to the transmission case, wherein
   an electromagnetic valve is included on the side cover side of the valve body,
   when viewed in a direction horizontal and parallel to mating surfaces of the transmission case and the side cover, a strainer for removing a foreign material in a hydraulic oil is disposed between the side cover and the valve body to overlap with at least a portion of the electromagnetic valve,
   the strainer has an inflow portion for allowing the hydraulic oil to flow in disposed vertically above an oil surface, and
   the hydraulic oil pumped by an oil pump is supplied to the inflow portion.

2. A vehicle transmission having a valve body disposed adjacently to and in parallel with a side cover covering a front or rear side or a side surface of a transmission case in a vehicle width direction in a vehicle-mounted state, the side cover connected to the transmission case, wherein
   an electromagnetic valve is included on the side cover side of the valve body,
   when viewed in a direction horizontal and parallel to mating surfaces of the transmission case and the side cover, a strainer for removing a foreign material in a hydraulic oil is disposed between the side cover and the valve body to overlap with at least a portion of the electromagnetic valve,
   the strainer has an inflow portion for allowing the hydraulic oil to flow in disposed vertically above an oil surface,
   the hydraulic oil pumped by an oil pump is supplied to the inflow portion,
   a first space is formed between the side cover and the strainer,
   a filter for filtering is disposed in the first space,
   the strainer has an outflow portion disposed vertically under the oil surface,
   the hydraulic oil flowing into the first space from the inflow portion passes through the filter and flows out from the outflow portion, and
   the hydraulic oil flowing out from the outflow portion is supplied through the valve body to a lubrication required portion.

3. The vehicle transmission according to claim 2, wherein the filter is disposed in the vertical direction, and
   the first space is divided into two spaces by disposing the filter in the vertical direction.

4. A vehicle transmission having a valve body disposed adjacently to and in parallel with a side cover covering a front or rear side or a side surface of a transmission case in a vehicle width direction in a vehicle-mounted state, the side cover connected to the transmission case, wherein
   an electromagnetic valve is included on the side cover side of the valve body,
   when viewed in a direction horizontal and parallel to mating surfaces of the transmission case and the side cover, a strainer for removing a foreign material in a hydraulic oil is disposed between the side cover and the valve body to overlap with at least a portion of the electromagnetic valve,
   the strainer has an inflow portion for allowing the hydraulic oil to flow in disposed vertically above an oil surface,
   the hydraulic oil pumped by an oil pump is supplied to the inflow portion,
   a first space is formed between the side cover and the strainer,
   a filter for filtering is disposed in the first space,
   at least one oil outflow hole is formed at positions lower than the inflow portion in the vertical direction of the strainer,
   the hydraulic oil flowing into the first space from the inflow portion passes through the filter and flows out from the oil outflow hole, and
   the hydraulic oil flowing out from the oil outflow hole is discharged to a second space on the transmission case side.

5. The vehicle transmission according to claim 4, wherein the filter is disposed in the vertical direction, and
   the first space is divided into two spaces by disposing the filter in the vertical direction.

* * * * *